United States Patent [19]

Arns et al.

[11] Patent Number: 4,458,977

[45] Date of Patent: Jul. 10, 1984

[54] SYSTEMS FOR FORMING IMPROVED REFLECTION HOLOGRAMS WITH A SINGLE BEAM

[75] Inventors: James A. Arns, Culver City; Timothy J. Edwards, Hermosa Beach; Gaylord E. Moss, Marina del Rey; John E. Wreede, Monrovia, all of Calif.

[73] Assignee: Hughes Aircraft Company, El Segundo, Calif.

[21] Appl. No.: 269,104

[22] Filed: Jun. 1, 1981

[51] Int. Cl.³ ............................................. G03H 1/04
[52] U.S. Cl. ................................. 350/3.6; 350/3.65
[58] Field of Search ............... 350/3.6, 3.65, 3.67, 350/3.83

[56] References Cited

U.S. PATENT DOCUMENTS

| | | | |
|---|---|---|---|
| 3,494,698 | 2/1970 | Neumann | 350/3.67 |
| 3,572,882 | 3/1971 | Neumann | 350/3.67 |
| 3,632,182 | 1/1972 | Sincerbox | 350/3.67 |
| 3,635,539 | 1/1972 | McMahon | 350/3.67 |
| 3,659,947 | 5/1972 | Neumann | 350/3.67 |
| 3,666,344 | 5/1972 | Mottier | 350/3.67 |
| 3,762,215 | 10/1973 | Aleksoff | 350/3.67 |

OTHER PUBLICATIONS

Green, P. S., *Acoustical Holography*, vol. 5, pp. 41–45.

Ross, M., (Ed.), *Laser Applications*, pp. 42–49, Academic Press, 1971.

Collier et al., *Optical Holography*, pp. 418–425, 437–438, Academic Press, 1971.

*Primary Examiner*—Bruce Y. Arnold
*Attorney, Agent, or Firm*—C. B. Bailey; A. W. Karambelas

[57] ABSTRACT

A hologram forming system for forming, from a single beam source and a reflective mirror, a reflective hologram in which spurious reflection and transmission hologram recordings are eliminated. Reflected rays are changed in phase relative to the primary beams during the recording period so that spurious holograms do not form. The remaining effect of the reflected rays is to slightly change the overall refractive index of a phase recording material (such as dichromated gelatin) with a resultant slight loss of available index of modulation or to slightly, uniformly, darken an amplitude hologram film, (such as silver halide) with a slight loss of available contrast. The invention includes hologram forming systems that move the cover plate relative to a fixed recording medium with and without a phase shifter in the primary beam and a hologram forming system that moves the substrate and mirror relative to the fixed cover plate.

17 Claims, 8 Drawing Figures

SPURIOUS TRANSMISSION

SPURIOUS REFLECTION

SYSTEMS FOR FORMING IMPROVED REFLECTION HOLOGRAMS WITH A SINGLE BEAM

TECHNICAL FIELD

This invention relates to a system and method for forming holograms and particularly to a system and method for forming, from a single wavefront of energy, reflection holograms with undesired spurious hologram recordings eliminated.

CROSS REFERENCE TO RELATED APPLICATIONS

This application is related to U.S. Pat. application No. 269,105 "Systems for Forming Improved Diffusion Holograms" by James A. Arns, Timothy J. Edwards, Gaylord E. Moss, and John E. Wreede; and U.S. Pat. application No. 269,106, "Double Beam Systems For Forming Improved Holograms" by James A. Arns, Timothy J. Edwards, Gaylord E. Moss and John E. Wreede, both referenced applications filed concurrently with this application.

BACKGROUND OF THE INVENTION

1. Field of the Invention

One of the problems associated with holograms is that diffraction optics display systems utilizing a hologram are degraded by the effects of the spurious reflection and transmission hologram recordings that are generated during the holographic exposure process. These spurious holograms have been found to be generated by reflections from surfaces which are interfaces of materials of differing index of refraction such as air-glass interfaces of the transparent surfaces of the recording cover plate, the substrate, the recording medium such as the gelatin or optical elements. These reflections combine with the primary holographic beams at the recording film to form both spurious reflection hologram recordings and spurious transmission hologram recordings. In a display system utilizing a hologram, the spurious reflection hologram recordings create ghost images and the spurious transmission hologram recordings create rainbow-like flare patterns. The purpose of this invention is to prevent the recording of the unwanted spurious holograms that are caused by reflections and thus to eliminate both ghost and flare images in the final display. The invention is directed to forming reflection type holograms from a single coherent beam such as a laser beam with elimination of undesired hologram recordings that result from spurious reflections.

2. Description of the Prior Art

Prior to this invention there was no known method to reduce the flare and ghost images of holograms to acceptable levels. These undesired images were of an especially high undesirable level in holograms formed from energy sources positioned at broad angles. The basic approaches that have been utilized in an attempt to minimize the problem are either to anti-reflection coat all reflective surfaces of the hologram forming system, to embed all optical elements in an index matching fluid when forming the hologram such that no air to glass interface reflections reach the hologram area, or form the hologram with the beams impinging the film supporting elements at Brewster's angle. The first method has been found to be inadequate because the best known anti-reflection coating provides results that are many times worse than required. The second method is generally unsuccessfull because the striations in large fluid volumes degrade the holographic recording process. A third approach of putting all reflective surfaces at Brewster's angle is only possible in very simple systems such as those in which flat optics and collimated beams are used. The third method is unsatisfactory because of the restriction of the angular placements of the recording, and hence playback, beams of the recording medium.

SUMMARY OF THE INVENTION

It is therefore an advantage of the invention to provide holograms in which undesired spurious reflection and transmission holographic recordings are substantially eliminated.

It is a further advantage of the invention to provide a reflective type display hologram in which ghost images and rainbow like flare patterns are eliminated in a display utilizing that hologram.

It is another advantage of the invention to provide a single beam system that forms reflection holograms in which spurious hologram recordings caused by surface reflections are eliminated.

It is still another advantage of this invention to provide a single beam hologram forming system that forms reflection holograms in which the spurious surface reflection holograms are eliminated and also in which phase changes in the primary recording beams are corrected.

The hologram forming systems in accordance with the principles of the invention utilize a single beam source that passes the beam through a cover plate, a first index matching fluid layer, a substrate, a recording medium, a second index matching fluid layer and then reflects the beam from a mirror surface to provide a second beam passing in the opposite direction through the recording medium to form reflective holograms. In order to prevent the formation of spurious holograms during the recording process, the outer reflective surfaces are continually moved or alternatively the reflective mirror and the substrate are continually moved. Each function is performed during the entire recording process so that the phase of the undesired reflective beams continually changes. Thus, the rays of the primary beam that reflect from the cover plate so as to cause spurious recordings, are changed in phase continually during the recording process and spurious holograms are prevented from being recorded. Alternately, for some configurations a multiple or double exposure hologram can be made in which the surface is moved such that the phases change in multiples of $\pi$ radians between exposures.

In one arrangement of the invention, the cover plate is moved relative to a fixed recording medium during the recording process to prevent the formation of spurious hologram recordings. In the simplest form of this arrangement, phase compensation of the beam is not provided to prevent secondary effects on the primary hologram from the movement of the cover plate. However, the hologram provided by this arrangement is substantially improved over the prior art holograms because of the elimination of spurious holograms. Some degradation of the primary hologram may occur but these secondary effects are insignificant for narrow angle recordings. Another arrangement in accordance with the invention eliminates the spurious holographic recordings, but includes a global phase shifter to correct the secondary effect on the primary recording. This secondary effect is more significant for wide angle recordings. The global phase shifter may correspond in type of surface configuration to that of the cover plate and may have a continually moving surface so as to eliminate any phase shift of the primary beams caused by the cover plate movement. Another arrangement in accordance with the invention continually moves the mirror and substrate during the recording process so as to prevent the formation of spurious hologram recordings. This latter arrangement does result in a negligible change of the phase relationship of the primary beams, but the hologram is not noticeably effected, even when formed at relatively wide angles. The rate of movement or phase change in accordance with the invention is a function of the exposure time which itself is a function of the sensitivity of the recording medium. The total amount of movement is that which is required to give a phase change of one or more half wavelengths.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings in which like reference numbers refer to like parts and in which:

DETAILED DESCRIPTION OF THE INVENTION

Figure 1:
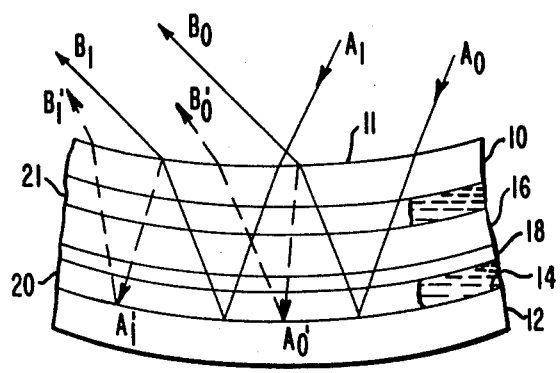
FIG. 1 is a schematic fragmentary side view of a portion of a single beam reflection hologram forming structure for explaining the reflective beams or rays that are present to form spurious hologram recordings.
Figure 1:
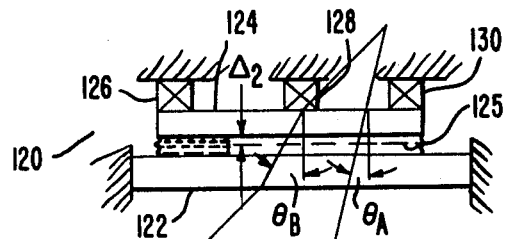

Referring first to FIG. 1 which shows a cross section of a typical conventional structure for providing reflection holograms utilizing a single beam, the spurious hologram recording problem will be explained. The recording structure includes a cover plate 10 having a reflective air to glass interface at surface 11 and includes a reflective mirror 12 having a reflective mirror surface 14. Positioned between the cover plate 10 and the surface of the mirror 14 is a substrate 16 having a recording medium 18 thereon which may be any suitable recording material such as dichromated gelatin positioned as a thin film on the bottom surface thereof. Suitable index matching fluids 20 and 21 are respectively retained between the mirror surface 14 and the recording medium 18 and between the substrate 16 and the cover plate 10. Thus, in the recording structures utilized in the invention, only the outer surfaces provide substantial reflection because the other surfaces are index matched. The fluid 20 may have a higher viscosity than the fluid 21 if desired. Primary rays $A_0$ and $A_1$ of a laser beam are applied to the structure and reflections $B_0$ and $B_1$ from the surface 14 of the mirror 12 provide the other primary beam at the recording medium 18. First order reflections $A_0'$ and $A_1'$ from the surface 11 of the cover plate 10 are reflected back through the recording medium 18. These rays reflect back from the mirror as $B_1'$ and $B_0'$ which combine with $A_0'$ and $A_1'$ as well as with the primary beams $A_0$, $A_1$, $B_0$, $B_1$ to create spurious holograms. Second order and higher order reflections form spurious reflection holograms that are relatively weak compared to the first order spurious holograms.

Figure 2:
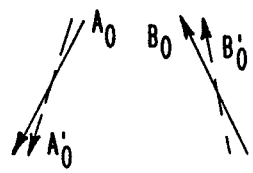
FIG. 2 is a schematic diagram showing the spurious transmission and reflection hologram forming rays developed by the structure of FIG. 1 without using the concepts of the invention.
Figure 2:
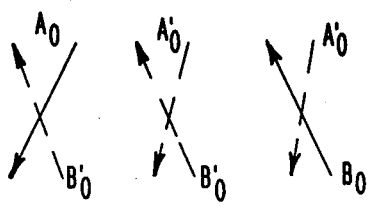

Referring now also to FIG. 2, spurious reflection holograms from rays $A_0'B_0$, $A_0B_0'$ and $A_0'B_0'$ will be formed at the recording medium 16 as a result of the surface reflections shown in FIG. 1. Also because of the first order surface reflections, spurious transmission holograms are formed from rays $A_0A_0'$ and $B_0B_0'$. Any spurious reflection or transmission holograms formed from higher order reflections from the surface 11 are many times weaker than the other holograms which are formed by interactions of the primary beam and first order reflections.

Figure 4:
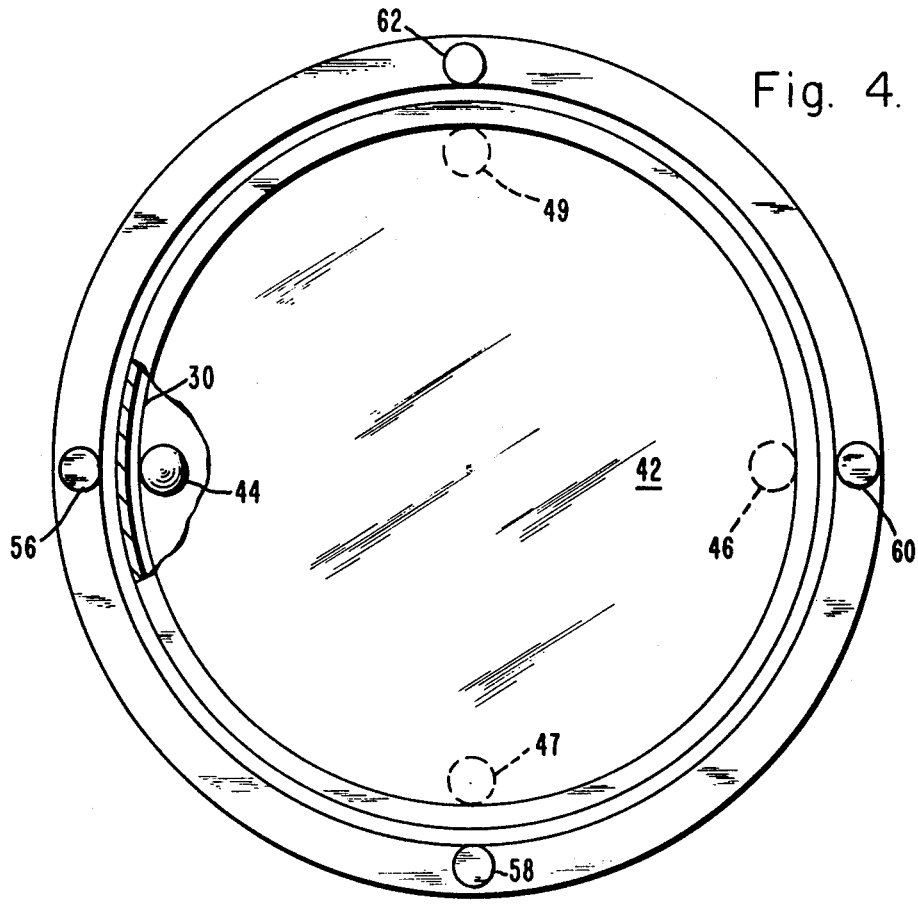
FIG. 4 is a schematic top view taken at lines 4—4 of FIG. 3.
Figure 3:
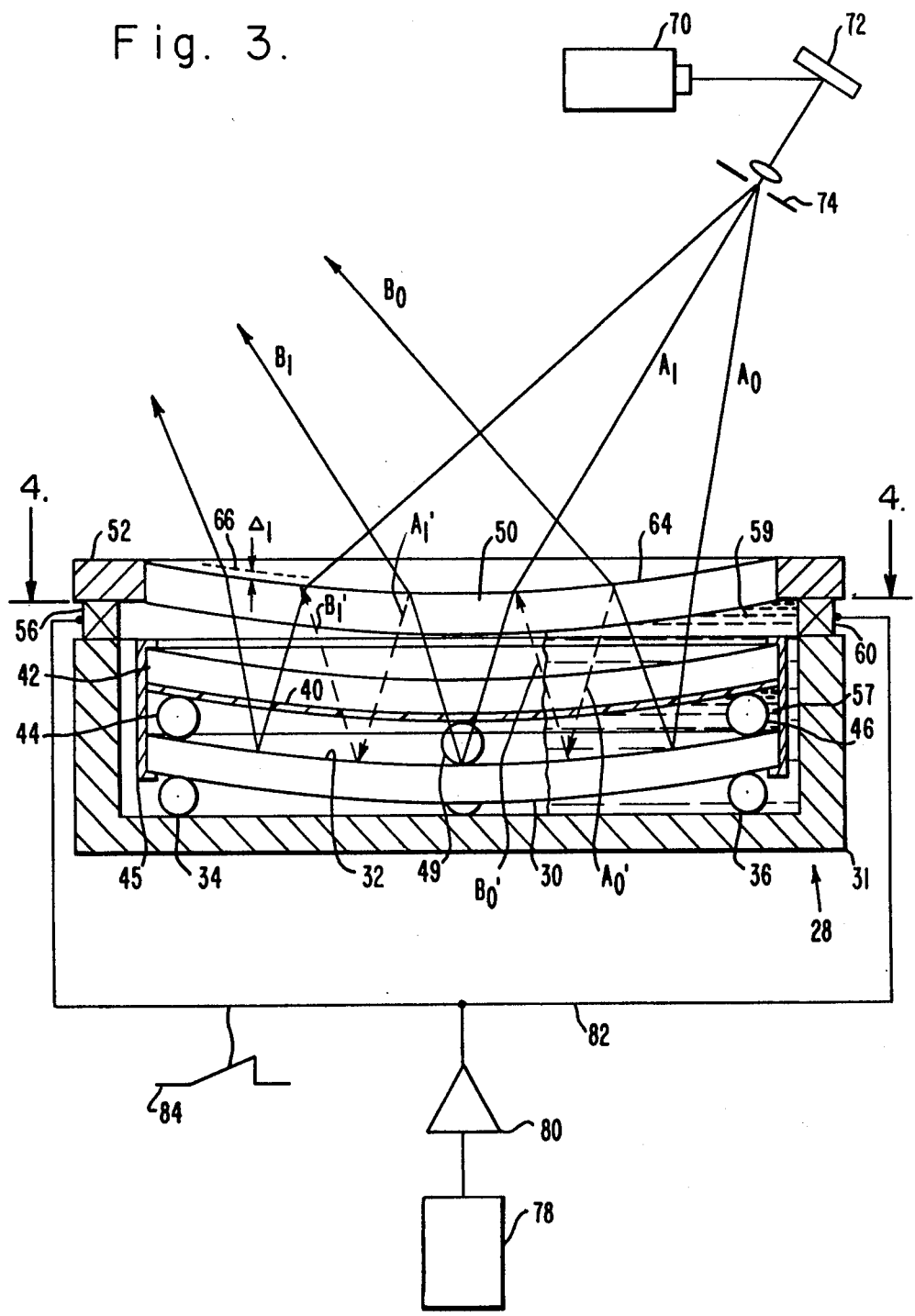
FIG. 3 is a schematic sectional view of a single beam system for forming a reflection hologram utilizing a movable cover plate and for substantially preventing spurious hologram recordings, in accordance with the principles of the invention.

Referring now to FIGS. 3 and 4 which show a system for forming a reflection hologram with spurious recordings eliminated by moving the reflective cover plate, a recording structure 28 includes a circular mounting structure 31. Positioned at the bottom of the mounting structure 31 is a mirror 30 having a reflective mirror surface 32 and being mounted to the bottom of the structure 31 by ball bearings such as 34 and 36 glued to both the structure 31 and the bottom of the mirror 30.

A recording medium or film 40 which may be any suitable phase type recording material such as a dichromated gelatin or any suitable amplitude type recording material such as silver halide, is attached to the bottom of a substrate 42. The recording medium 40 and substrate 42 are fixed in position relative to the mirror surface 32 by ball bearings 44, 46, 47 and 49 as shown in FIG. 4 and a clamp 45 may retain the substrate 42 in position relative to the mirror. Other methods of support are possible within the scope of the invention. A cover plate 50 is positioned above the substrate 42 and is fixedly mounted to a mounting ring 52. In order to provide motion of the cover plate 50, the mounting ring 52 is attached to the structure 31 with suitable transducers such as piezoelectric cylinders 56, 58, 60 and 62 as shown in FIG. 4. It is to be noted that although the movement is illustrated in FIG. 3, as well as in FIGS. 5 and 8 by piezoelectric cylinders, any suitable type of movement control or transducer arrangement may be utilized such as piezoelectric stacks, motor driven micrometers, electromagnetic transducers, thermal means or manual means, all within the scope of the invention. The cover plate 50 is movable a distance $\Delta_1$ so that a top surface 64 moves to a position indicated by a dotted line 66. The mirror surface 32, the film 40, the substrate 42 and the cover plate 50 are all shown as having curved surfaces in the illustrated system. However, it is to be understood that the surfaces of the transmissive or reflective elements may be flat or have any desired configuration, all within the scope of the invention. Positioned between the mirror surface 32 and the recording medium 40 and between the substrate 42 and the cover plate 50 are suitable refractive index matching fluids or oil 57 and 59, not requiring sealing bellows for retention around the cover plate 50 when the surfaces are curved as shown. It is to be noted that although the recording medium is illustrated as being positioned on a substrate in the systems of FIGS. 3, 5 and 8, the principles of the invention include positioning the recording medium on the surface of the mirror in each of these systems.

The laser wavefront applied to the recording structure 28 is provided by a laser 70 which applies a beam to a mirror 72 which is then reflected to suitable beam shaping structure such as a spatial filter 74, which as is well known in the art, includes a lens and an opening of a selected size. Suitable optics (not shown) may be provided between the spatial filter 74 and the surface 64 so that the beam has a phase front at the cover plate 50 that may be spherical, for example, to match the curvature of the cover plate 50. Any desired beam shape may be utilized such as a configuration to correct for optical problems such as spherical aberrations. The beam is then applied to the cover plate 50 and to the mirror surface 32 where it is reflected back through the recording medium 40 to the surface 64. The ray $A_0$ for example forms ray $B_0$ after reflection from the mirror surface 32 and the ray $A_1$ after reflection forms the ray $B_1$. Reflecting B rays combine with appropriate incoming A rays in the recording medium 40 to form the primary hologram thereat.

Control of the four piezoelectric cylinders moving the cover plate 50 is provided by a ramp generator 78 which applies a suitable varying voltage such as a ramp voltage shown by a waveform 84, to an amplifier 80 and in turn to a lead 82 which is coupled to piezoelectric cylinders 56, 58, 60 and 62. It is to be understood that the driving waveform does not have to be of a constantly varying amplitude or of a constant frequency. It is to be noted that the transducers are not limited to piezoelectric cylinders but may include any suitable transducer such as piezoelectric stacks, motor driven micrometers, electromagnetic transducers, thermal means or manual means. All of the piezoelectric cylinders are also connected to a reference or ground voltage (not shown).

In operation, when a hologram is being recorded in the recording medium 40, a ramp voltage of a waveform 84 is applied to the piezoelectric cylinders and the cover plate 50 moves over one or more cycles of phase change for the beams reflected from the cover plate during the recording period. The primary hologram recordings are formed in the recording medium 40, with the primary beams being maintained at a substantially constant relative phase. The desired hologram in the systems of the invention is the hologram formed by interference between primary rays. As the cover plate 50 moves, the reflected beams such as $A_0'$ and $B_0'$ continually change in phase relative to the primary beams and thus spurious holographic recordings are prevented from being formed. The change of relative phase between the reflected beams and the primary beams prevents any but very low intensity spurious recordings from being formed at the recording medium 40.

Figure 6:
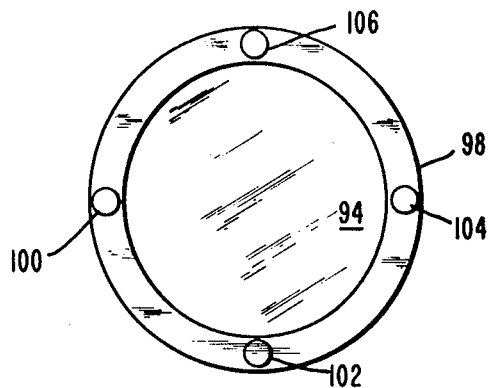
FIG. 6 is a schematic top view taken at lines 6—6 of FIG. 5 for further explaining the phase shifter structure.
Figure 5:
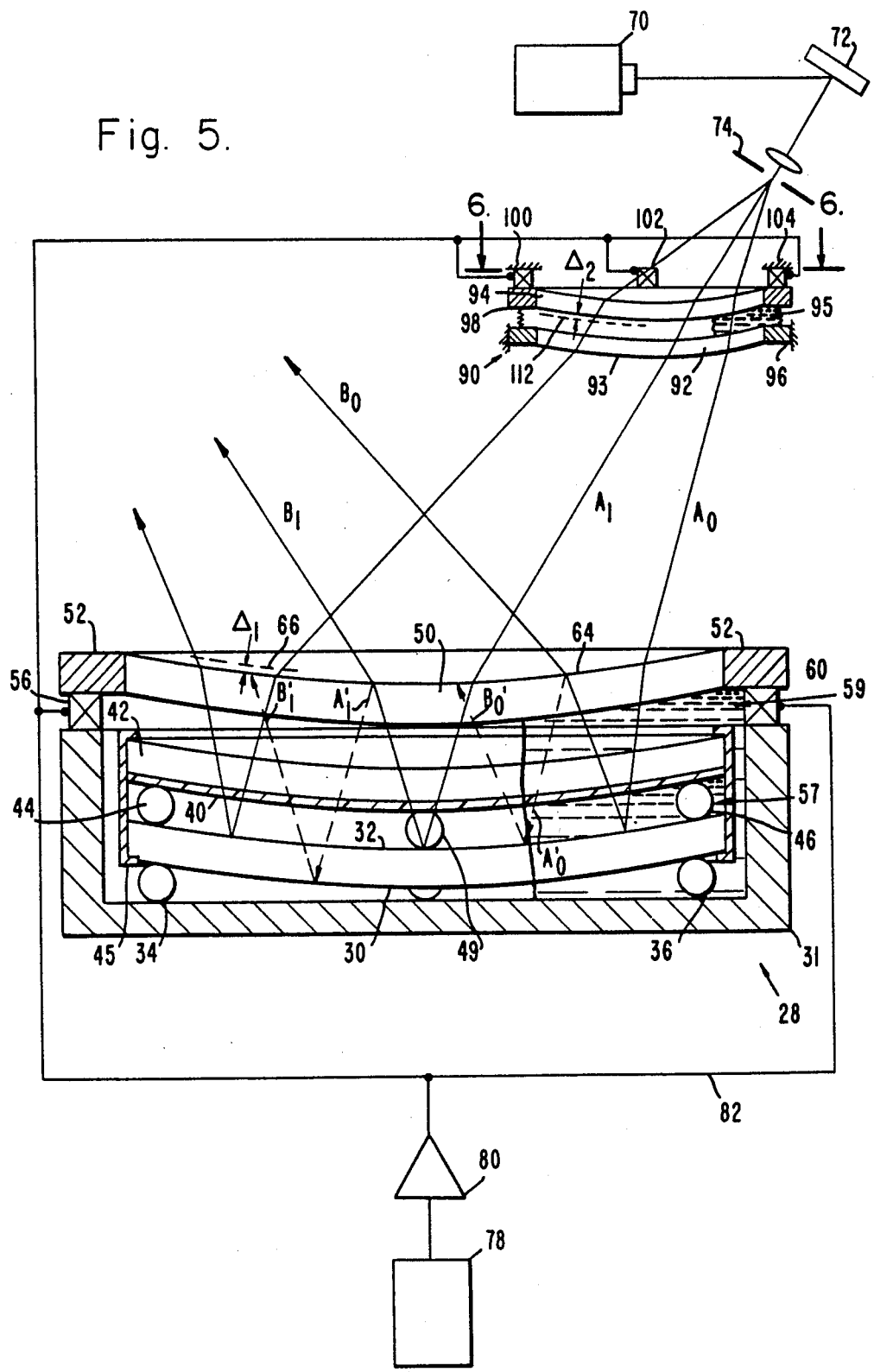
FIG. 5 is a schematic sectional view of a single beam system for forming a reflection hologram utilizing a movable cover plate for preventing spurious hologram recordings and utilizing a phase shifter for maintaining the phase relationship of the primary recording beams, in accordance with the principles of the invention.

Referring now to FIGS. 5 and 6, a system is shown utilizing a phase shifter 90 to form, from a single beam, a reflective hologram in which spurious holographic recordings are eliminated and in which the primary hologram is not lowered in intensity even when formed over a wide angle. The recording structure 28 and other elements of the system are the same as explained relative to FIG. 3 and have like reference numerals. Between the spatial filter 74 and the cover plate 50, the phase shifter 90 is positioned having curved surfaces of windows 92 and 94, the curvature being of the same type as used in the recording structure 28. An index matching fluid 95 is suitably maintained between the windows 92 and 94 and reflections only occur at the outer surfaces of the index matched structure. The phase shifter 90 also includes a mounting ring 96 which holds the window 92 and is fixedly mounted to a suitable structure (not shown). The window 94 is positioned in a mounting ring 98 which in turn is mounted to four transducers which may be piezoelectric cylinders 100, 102 and 104 and piezoelectric cylinder 106 as shown in FIG. 6. Any suitable number of piezoelectric cylinders may be utilized. The window 94 moves a distance $\Delta_2$ so the lower surface of the window 94 moves to a position of a dotted line 112, the movement to the dotted line 112 being one or more times during a recording period.

Control of the piezoelectric cylinders of the structure 28 is provided by the ramp voltage applied through the lead 82 to the piezoelectric cylinders 56, 58, 60 and 62 (FIG. 3). The piezoelectric cylinders 100, 102, 104, and 106 of the phase shifter 90 are directly coupled to the lead 82 for being controlled to move the distance $\Delta_2$ which in the illustrated system is the same as $\Delta_1$. Each cylinder is also coupled to a source of reference potential (not shown). The window 94 and the cover plate 50 move together to the respective dotted lines 112 and 66 and may move between the dotted lines and the position of the surface several times during a recording period.

Figure 7:
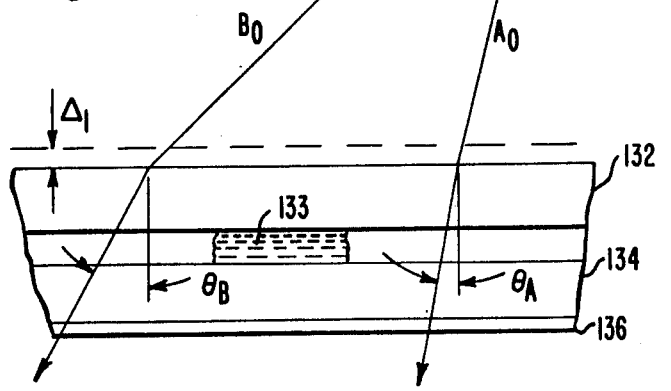
FIG. 7 is a schematic fragmentary side view of a single beam system for further explaining the operation of the phase shifter of FIG. 5.

The total vertical axis phase shift provided by phase shifter 90 is $(n-1)\Delta_2$ and the total vertical axis transmission phase shift provided by moving surface 64 is $(n-1)\Delta_1$ so that $\Delta_2$ must be equal to $\Delta_1$ for the phases of the primary beams to remain unchanged. The term n is the index of refraction of the index matching fluid. The ray $A_0'$ has a total phase shift of $2n\Delta_1$ which is typically in excess of a wavelength. Thus, the reflected beam $A_0'$ has a total phase shift relative to the primary beams of $2n\Delta_1$. The above discussion of phase shift does not consider that the phase at each ray is also a function of the ray angle (FIG. 7). It is to be noted that $\Delta_1$ and $\Delta_2$ are the displacements of the respective moving surfaces along the vertical axis of FIG. 5. Actual phases along the rays are a function of the ray angle and the vertical displacement, but the ray angle which will be explained relative to FIG. 7 has not been considered for simplicity of explanation. Thus, the phase of the primary rays is maintained constant at the recording medium 40 and phase of the first order reflective rays such as $A_0'$ are varied typically over several cycles of phase change to prevent formation of spurious holographic recordings.

To further explain the correspondence of angles of each ray between the phase shifter unit and the cover plate, reference is now also made to FIG. 7 which is a sectional view of a global phase shifter and a portion of a recording structure with the surfaces of both being flat for clarity of explanation. In order to lock the phases of the primary exposure beam in the system of FIG. 5, a phase compensation must be provided for the variation of path lengths of rays in the entire wavefront since the rays over the wavefront have different path angles and path lengths. A global phase shifter 120 is shown having windows 122 and 124 with the window 122 being fixedly mounted to a suitable structure (not shown). A refractive index matching liquid 125 such as oil is retained between the windows 122 and 124. The window 124 is glued or attached to transducers such as four piezoelectric cylinders including cylinders 126, 128 and 130 which in turn are mounted at the top to a suitable fixed structure (not shown). The illustrated portion of a hologram forming structure includes a moving cover plate 132 and a substrate 134 to which a recording medium or film 136 is attached. A refractive index matching liquid 133 is positioned between the cover plate 132 and the substrate 134. The two rays $A_O$ and $B_O$ pass through the moving cover plate 132 at different angles $\theta_A$ and $\theta_B$. It is to be noted that by moving the cover plate 132 a distance $\Delta_1$, the path length change for each ray $A_O$ and $B_O$ is different since it depends inversely on the cosine of $\theta$. Thus, in order to lock the phases relative to each other of the main exposure beams as shown in FIG. 5, the phase shifter 120 must correct the phase of each ray in the inverse ratio of the cosine of $\theta$. The phase shifter 120 is an index matching structure with a surface and refractive index that substantially matches that of the cover plate 132. Thus the angles through the phase shifter 120 such as angles $\theta_A$ and $\theta_B$ correspond to the angles for each ray passing through the cover plate 132. The phase shifter 160 automatically adjusts each ray in proportion to its own inverse cosine function so that the path length compensation over all of the surface of the cover plate 132 is of the proper amount. The phase shifter 120 provides the desired phase shifts as a function of the curvature of its surfaces, the rate of movement of $\Delta_2$ and the focal point (at the spatial filter) from which the rays are applied. Thus, a requirement exists for the phase shifter of the invention that the angles such as $\theta_A$ for each single ray must be the same for both the cover plate and the phase shifter.

Accordingly, in the system of FIG. 5, the global phase shifter 90 corrects the phase of the main beam so that each ray is at a constant phase and so that each of the two recording beams at any point on the hologram maintain their relative phase relationships. At the same time, the moving cover plate 50 changes the phase of reflected beams relative to the primary recording beams to prevent formation of spurious hologram recordings from first order reflections.

Figure 8:
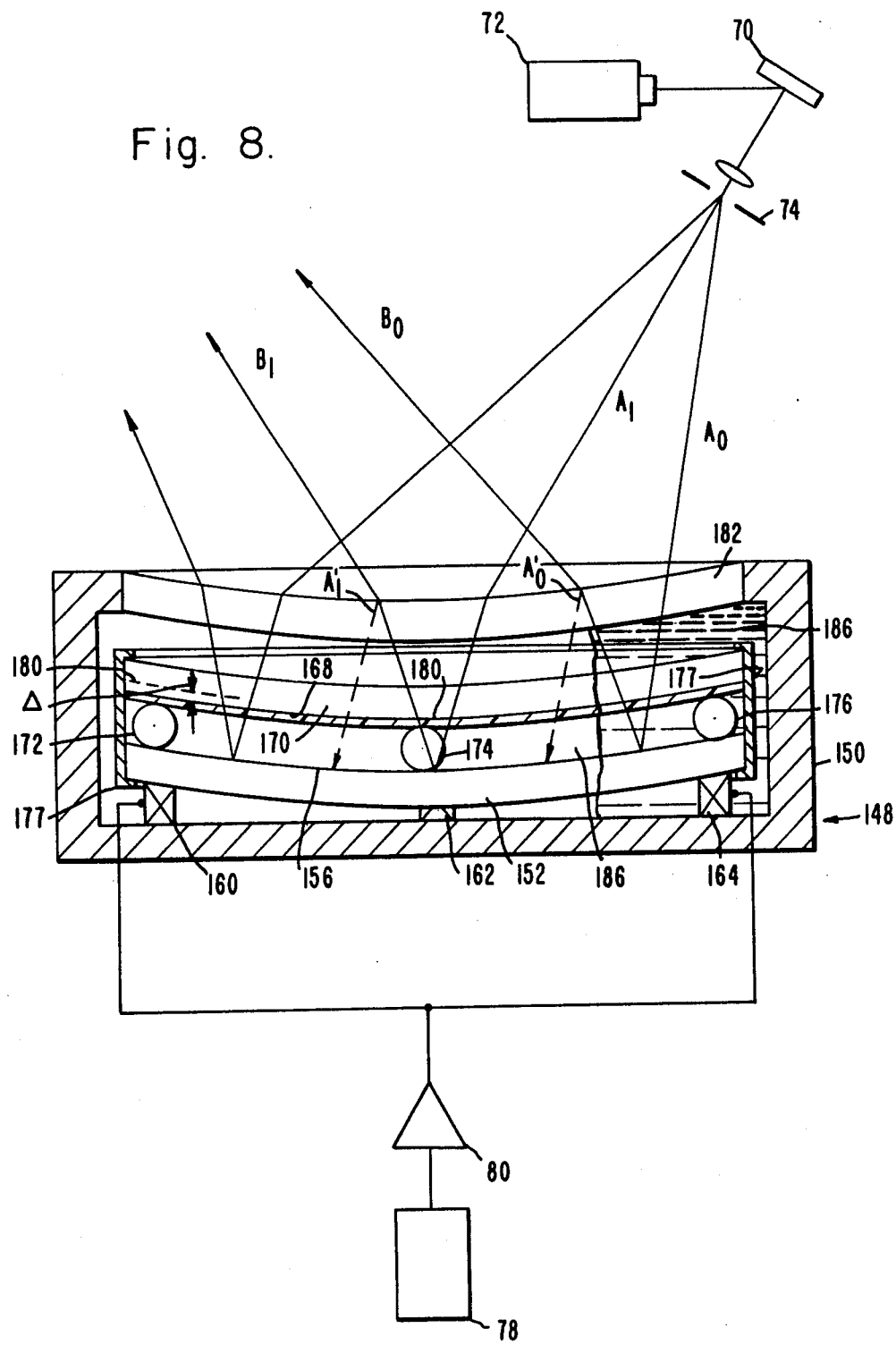
FIG. 8 is a schematic sectional view of a single beam system utilizing a movable substrate and mirror for preventing the formation of spurious hologram recordings, in accordance with the principles of the invention.

Referring now to FIG. 8 which shows a single beam system having a movable substrate and mirror, a reflective hologram is formed in which it is assumed that the angles are small enough so that phase compensation of the primary beam is not required. A recording structure 148 includes a mounting structure 150 with a mirror 152 having a mirror surface 156 and positioned near the bottom of the structure 150. Transducers such as piezoelectric cylinders 160, 162 and 164 and a fourth cylinder (not shown) are fixed to the bottom of the mirror 152 and to the bottom of the structure 150 for moving the mirror. A recording medium 168 is positioned on the bottom of a substrate 170 with ball bearings such as 172, 174 and 176 glued between the mirror surface 156 and the recording medium 168 to form a composite structure when held by a clamp 177. Any suitable phase type recording material such as a dichromated gelatin or any suitable amplitude type recording material such as silver halide may be used to form the recording medium 168. Also within the scope of the invention, the recording medium 168 may be positioned on the surface 156 of the mirror 152, eliminating the requirement of a substrate. The mirror 152 and the recording medium 168 move, a selected number of times during a recording period, a distance $\Delta$ as indicated by a dotted line 180. A cover plate 182 is fixedly mounted to the mounting structure 150. A suitable refractive index matching fluid 186 is positioned between the mirror surface 156 and the recording medium 168 and between the substrate 170 and the cover plate 182 so as to provide an index matched structure that prevents reflections from occurring at the inner surfaces other than the mirror surface 156. Because the surfaces of the recording elements are curved in the illustrated system, a fluid seal is not required, but such a seal may be required with other surface shapes. The beam forming elements and waveform source elements are common to the system of FIG. 5, and have corresponding reference numerals for simplicity of explanation.

In operation, the ramp generator 78 applies a ramp voltage or other suitable voltage such as a voltage having a triangular waveform to the four piezoelectric cylinders including cylinders 160, 162, and 164 during the recording process. The laser rays such as $A_0$ and $A_1$ continually change in phase during the recording process because of the movement of the mirror surface 156. However, the relative phase of the primary recording beams such as the phase between rays $A_0$ and $B_0$ and between rays $A_1$ and $B_1$ does not change due to the movement $\Delta$ so that phase compensation of the primary beams is not required. However, the movement of the mirror surface 156 during the recording process, continually varies the phase of the reflected beams such as $A_0'$ and $A_1'$ relative to the phase of the primary beams. Thus, spurious hologram recordings from either first or higher order reflections are not recorded because constant phase positions of the reflected beams are moved over varying positions on the recording medium 168. As explained relative to FIG. 3, the ray $A'_O$ has a total phase shift at the recording medium 168 of $3n\Delta$ which is typically in excess of $\pi$ radians. Thus, the reflected beam has a total phase shift relative to the primary beams of $2n\Delta$. The fringe lines of the spurious holograms that would be recorded are smeared over an area of the recording medium 168 and thus do not cause undesired diffraction effects in the final hologram.

It is to be recognized that the system of FIG. 8 may utilize a phase shifter in the beam path with the same advantages as discussed relative to FIG. 5.

It is to be noted that the systems in accordance with the invention may have any desired surface configurations and are not limited to spherical or flat surfaces. Further, it is to be noted that although the systems have been illustrated as forming a circular hologram, the principles of the invention are equally applicable to forming holograms on a film of any desired shape such as a rectangle. Also, the phase movement of the reflected rays may be controlled by the ramp generator to include one or more cycles or a portion of a cycle, of phase excursions during the recording period. The required exposure energy principally determines the recording period which typically varies from nanoseconds to hours for dichromated gelatin recordings. It is to be noted that the principles of the invention are applicable to step type systems such as double exposure systems with one or more step movements of the apparatus such as the cover plate or substrate during the exposure process. In a double exposure type system, the step is in the middle of the recording period and the cover plates are moved a distance causing a phase shift of λ/2 so undesired recordings are cancelled. Also, in the recording structure, materials other than glass may be utilized such as semiconductor materials depending on the wavelength of the radiation, all within the scope of the invention. It is further to be noted that although groups of four transducers and supporting ball bearings were illustrated, any desired number may be used such as groups of three.

The principles of the invention are not limited to any particular wavelength and are applicable to beams or wavefronts from lasers as well as all electromagnetic radiation emitters and acoustic emitters with sufficient coherence to register an interference pattern. Also within the scope of the invention, the rays can be from a beam resulting from convergent, divergent or collimated sources. The format of the hologram in accordance with the invention can be generated by a single overall exposure, a series of adjacent exposures or a series of overlapping exposures, or any combination thereof. In the systems of the invention, the movable cover plate or the movable substrate and mirror can be mounted in a loose manner in order to allow incidental movement, with the entire system being caused or allowed to vibrate.

Thus, there has been described single beam hologram forming systems which form holograms without phase compensation of the primary beams for surface movement, which form holograms by compensating the phases of the primary beams with a phase shifter, and which forms holograms when moving the mirror and recording medium together to automatically compensate the phases of the main beams for the movement. The systems prevent the formation of spurious hologram recordings since the phase relation of the spurious reflected beams continually changes relative to the primary beams. The only effect of the spurious reflected rays is to cause a slight overall darkening of a hologram recorded in an amplitude recording material such as silver halide. In a phase recording material such as dichromated gelatin, the film is not darkened but the maximum available index of modulation is limited slightly by the effect of the spurious rays.

What is claimed is:

1. A system for recording, during a recording period, a hologram from a source of a single beam while substantially preventing the formation of spurious hologram recordings comprising:
a recording structure including
a reflective mirror,
a cover plate positioned adjacent to said mirror for receiving rays of said single beam, said cover plate having a reflective surface,
a substrate having a recording medium on a surface thereof and positioned between said mirror and said cover plate,
an index matching fluid retained in spaces between said cover plate and said substrate and between said substrate and said mirror; and
means coupled to said recording structure for changing the phase at said recording medium, of spurious reflection rays, said rays composed of rays reflected sequentially from said mirror and the reflective surface of said cover plate, relative to the phase of rays of said single beam and the rays reflected from said mirror to said recording medium.

2. The combination of claim 1 which said mirror, substrate and recording medium are fixedly mounted relative to each other and in which said means coupled to said recording structure includes
means coupled to said cover plate for continually moving the reflective surface during said recording period so that said spurious reflection rays change in phase relative to the rays of the single beam and the single beam rays reflected to said recording medium from said mirror.

3. The combination of claim 2 in which said means coupled to said cover plate includes piezoelectric means mounted between a fixed structure and said cover plate, and
a source of a varying voltage coupled to said piezoelectric means for continually moving the cover plate so that rays reflected from the cover plate continually change phase during the recording period.

4. The combination of claim 3 in which said piezoelectric means includes a plurality of piezoelectric cylinders.

5. The combination of claim 2 further including a phase shifter positioned in said single beam between said source and said cover plate, said phase shifter comprising:
a first window fixedly positioned;
a second window positioned adjacent to said first window;
an index matching fluid retained between said first and second windows; and
means, coupled to said second window and fixedly mounted, for moving said second window to change the phase of rays of said single beam at the output of said phase shifter an amount similar to the phase change of said single beam at the surface of said cover plate.

6. The combination of claim 5 in which said means coupled to said cover plate includes piezoelectric means mounted between a fixed structure and said cover plate and said means coupled to said second window includes piezoelectric means mounted between a fixed structure and said second window and coupled to said source of a varying voltage for moving said second window selected distances related to the movement of said cover plate during the recording period.

7. The combination of claim 6 in which said piezoelectric means coupled to said cover plate and said piezoelectric means coupled to said second window are each a plurality of piezoelectric cylinders.

8. The combination of claim 1 including:
means to fixedly mount said cover plate;
means mounting said mirror, substrate and reflective medium as a combined structure; and wherein
said means coupled to said recording structure includes means coupled to said combined structure for moving said combined structure during the recording period.

9. The combination of claim 8 in which said means coupled to said combined structure includes piezoelectric means and in which said means coupled to the recording structure for changing the phase includes a source of a varying voltage coupled to said piezoelectric means.

10. The combination of claim 9 in which said piezoelectric means includes a plurality of piezoelectric cylinders.

11. A system for recording a hologram comprising a recording structure including a recording medium positioned between a reflector and a cover plate, means to apply a single beam to said recording structure, and means for changing the phase of rays reflected from said cover plate relative to phase of rays in said beam and the phase of rays reflected from said reflector.

12. The combination of claim 11 wherein said changing means comprises means for moving said recording structure during a recording period.

13. The combination of claim 12 wherein said moving means comprises means for relatively moving elements of said recording structure.

14. The combination of claim 12 wherein said moving means comprises means for moving said cover plate relative to said recording medium and reflector.

15. The combination of claim 12 wherein said moving means comprises means for moving said recording medium and reflector relative to said cover plate.

16. A system for recording a hologram comprising a recording structure including a recording medium positioned between a reflector and a cover plate, means to apply a single beam to said recording structure during a recording period.

17. The combination of claim 16 wherein said moving means comprises means for relatively moving elements of said recording structure.

* * * * *